US006888088B2

(12) United States Patent
Bolton et al.

(10) Patent No.: US 6,888,088 B2
(45) Date of Patent: May 3, 2005

(54) HARDFACING MATERIALS & METHODS

(76) Inventors: Jimmie Brooks Bolton, 10459 Twin Cir., Montgomery, TX (US) 77356; Billi Marie Rogers, 10211 Chevy Chase Dr., Houston, TX (US) 77042

( * ) Notice: Subject to any disclaimer, the term of this patent is extended or adjusted under 35 U.S.C. 154(b) by 110 days.

(21) Appl. No.: 10/286,307

(22) Filed: Nov. 1, 2002

(65) Prior Publication Data

US 2004/0084421 A1 May 6, 2004

(51) Int. Cl.[7] .............................. B23K 1/19; B23K 5/10; B23K 5/16; B23K 9/23; B23K 11/20; B23B 7/02
(52) U.S. Cl. .................. 219/76.1; 219/121.11; 219/137 R; 219/148; 219/603; 427/449; 427/262; 428/409; 428/553; 428/615; 428/212
(58) Field of Search ................ 219/76.1, 603, 219/121.11, 137 R, 148, 148.1; 427/449, 262; 428/409, 553, 615, 212

(56) References Cited

U.S. PATENT DOCUMENTS

| | | | | |
|---|---|---|---|---|
| 4,163,071 A | | 7/1979 | Weatherly et al. ............ 427/34 |
| 4,289,538 A | * | 9/1981 | Orso ....................... 106/286.5 |
| 4,562,124 A | * | 12/1985 | Ruka .......................... 429/30 |
| 4,888,254 A | * | 12/1989 | Reichner ..................... 429/31 |
| 5,106,706 A | * | 4/1992 | Singh et al. .................. 429/31 |
| 5,268,946 A | * | 12/1993 | Bryan et al. ................. 376/414 |
| 5,294,462 A | * | 3/1994 | Kaiser et al. ............... 427/446 |
| 5,350,560 A | | 9/1994 | Kasiske ....................... 420/38 |
| 5,641,921 A | * | 6/1997 | Dennis et al. ................ 75/230 |
| 5,910,376 A | * | 6/1999 | Kelly ......................... 428/558 |
| 6,090,497 A | * | 7/2000 | Mori et al. .................. 428/641 |
| 6,165,594 A | * | 12/2000 | Moh et al. ................... 428/207 |
| 6,254,938 B1 | * | 7/2001 | Pranevicius et al. ........ 427/453 |
| 6,428,858 B1 | * | 8/2002 | Bolton et al. ............... 427/449 |

OTHER PUBLICATIONS

Development and Selection of Filler Metals for Bulk Welding, Arnoldy et al, Welding Journal, Feb. 1969.
Iron–Chromium–Carbon Hardfacing with the Bulkweld Process, Arnoldy et al, Metal Progress, Nov. 1977, pp. 31–35.

* cited by examiner

Primary Examiner—Deborah Jones
Assistant Examiner—Jason L Savage
(74) Attorney, Agent, or Firm—Guy McClung

(57) ABSTRACT

A method for applying wear resistant material to a substrate, the substrate comprised of material with a substrate coefficient of thermal expansion, the method including applying the wear resistant material to the substrate with application apparatus, the wear resistant material having a wear resistant material coefficient of thermal expansion, the substrate coefficient of thermal expansion within 15% of the wear resistant material coefficient of thermal expansion.

19 Claims, 3 Drawing Sheets

HARDFACING MATERIALS & METHODS

BACKGROUND OF THE INVENTION

1. Field of the Invention

The present invention is directed to hardfacing materials and methods for applying them.

2. Description of Related Art

Pieces, parts and components in a variety of machines, devices, and apparatuses are subjected to abrasive and erosive wear, often in a corrosive media. For years attempts have been made to solve these problems by applying hard wear-resistant layers to these components, e.g. means as brazing inserts of hard materials to critical areas or by applying hard coatings to the surfaces by detonation gun, plasma arc spraying (transferred and non-transferred), welding (gas or electric arc), electroplating, sputtering or ion plating. All of these suffer from certain limitations. The use of inserts is expensive and is not compatible with most application geometries. Detonation gun coating provide some of the best coatings, but are limited in the thicknesses that can be applied, the geometries that can be addressed, and may be relatively expensive for some high volume applications. Sputtering and ion plating are expensive. Electroplating can be limited in the materials that can be effectively used, chromium probably being the hardest of those used for wear resistance.

A variety of welding techniques are commonly used to apply the general class of hardfacing compositions. These materials have good wear resistance and can be applied in thick layers. Hardfacing material fused on the surface of a substrate can involve a significant amount of dilution with the substrate metal. This is a result of mixing of molten hardfacing and the surface of the substrate, which can reduce the wear resistance of the deposit and waste material. Often the control of the process is limited and very rough surfaces are created, which are removed by grinding before the component can be placed in service. Grinding costs can add additional expense.

In several prior art hardfacing techniques, a series of cracks result in the hardfacing; e.g. see U.S. Pat. Nos. 3,494,749; 5,224,559; 3,402,459; and 3,407,478, all incorporated fully herein for all purposes. This cracking is undesirable since the crack tips can become stress concentrators, and the crack can propagate through the material. Cracks can collect foreign materials and become a potential corrosion site. To deal with these problems, parts have been made thicker and heavier to withstand the cracking. In some cases parts have been over-designed to compensate for the existence of cracks or to try to eliminate crack propagation altogether. Some parts have been used or allowed to run without the benefits of surfacing because dealing with cracks is too time consuming and expensive.

Often hardfacing materials used for surfacing by welding are relatively higher alloyed than the materials to which they are applied. High alloy steel is an iron-carbon alloy containing at least 5% by weight of additional elements. Higher alloyed steel has 4 to 8 times by weight additional elements. The difference in alloy content can affect the coefficient of thermal expansion in such a manner that surface cracking results. This cracking is caused by the difference in the coefficient of thermal expansion of the surfacing and the coefficient of thermal expansion of the substrate. Post-weld cracks can form initially upon solidification from the molten weld as a stress relief mechanism; or they can form when stress caused by differences in coefficient of thermal expansion exceeds the tensile strength of the material. In many cases an initial surfacing contains no cracks, but subsequent heating and cooling cycles promote fatigue cracking. In many cases the asserted stress relief function of unwanted cracks is of minimal value.

SUMMARY OF THE PRESENT INVENTION

The present invention, in certain embodiments, provides a hardfacing material whose coefficient of thermal expansion is a relatively closer match (as compared to prior art materials) to the coefficient of thermal expansion of a substrate material to which it is to be applied. In certain aspects these coefficients are within at least 15% of each other.

In certain embodiments amount of arsenic, bismuth, antimony and/or cerium are added to known hardfacing materials. These added elements modify the hardfacing material's coefficient of thermal expansion in a desired way and can serve as tensile strengtheners. In certain particular aspects these materials along or in any possible combination are present in amounts between 0.01 to 0.0001% by weight.

In one aspect a cored wire has at its filler elements or compounds that alloy with an outer tubing or sheath to produce a desired chemistry in a weld or overlay. In one aspect the filler contains arsenic, bismuth, antimony and/or cerium and the sheath contains, but is not limited to pure iron, alloyed steel, stainless steel, pure nickel, pure cobalt. Other desired alloying material that produces a desired weld chemistry may be used in the sheath. In certain aspects, a filler can contain inert gas liberators, oxygen attractors, and/or fluxes. For example, titanium is an oxygen attractor elemental carbon and compounds that form carbon monoxide or carbon dioxide are inert gas liberators; and silicon or manganese can serve as fluxes.

In one aspect the elements (arsenic, bismuth, antimony, and/or cerium) are added to a flux coating on an exterior of a solid and/or cored wire (with filler) to form a welding electrode. The electrode deposits the hardfacing of the desired chemistry, creating the matched coefficient of thermal expansion alloy; and in one aspect a match of up to 15%.

In one aspect the material is added to an arc established between an electrode and a base material (substrate) with a resulting weld puddle alloyed and its coefficient of thermal expansion modified to match that of the base material, and, in one aspect, a match of up to 15%.

In one aspect the elements (arsenic, bismuth, antimony, and/or cerium) may be added to a molten alloy, which is then atomized to produce a powder; and is then used for welding and surfacing, e.g., with laser, plasma transferred arc, HVOF (high velocity oxygen fuel), nontransferred plasma, sintering and/or sintering and hot isostatic pressing (typically done in a furnace). In one particular aspect, material according to the present invention is applied with a laser cladding apparatus (such as described in U.S. Pat. No. 5,418,350) to helicopter skid wear plates (in certain aspects to a thickness between 0.10 inches and 0.20 inches).

In certain embodiments the addition of the added element (s) results in a microstructure in a finished deposit that includes a plurality of acicular needle-like forms—parts with one dimension much longer than another, e.g. a length difference of at least 70%, and, in certain aspects, a length difference in the range of 70% to 90%. In one aspect to avoid cracking in the resulting structure, a substrate is preheated, prior to depositing the hardfacing material, to avoid rapid cooling that can cause unwanted cracking.

In certain embodiments, a hardfacing deposit with materials according to the present invention results in a relatively more homogenous material than is achieved with certain prior art materials and methods. For example, some prior art material has a homogeneity of about 50% whereas a homogeneity of about at least 80% and in some embodiments in the range of about 80% to about 90% can be achieved with materials and methods according to the present invention.

Also, with an acicular needle-like microstructure in a hardfacing deposit according to the present invention, the needle-like structures are so oriented with respect to each other and so interlocked that the final deposit has a relatively higher strength as compared to prior art materials. This reduces a material's tendency to fracture due to residual stress, as does more closely matching coefficients of thermal expansion. One advantage of the interlocking, acicular microstructure is resistance to cracking.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious wear-resistant materials and methods of their application to substrates;

Such materials with a relatively close match of coefficients of thermal expansion of surfacing material and of substrate material;

Such materials with amounts of arsenic, bismuth, antimony and/or cerium, present, in certain aspects, at levels by weight between 0.01 to 0.0001%;

Such materials with such added elements with a resulting acicular needle-like microstructure;

Such materials with such a microstructure that improves strength and reduces a tendency to crack and/or fracture;

Such materials in the form a wire useful in welding processes;

Such materials used on methods that include preheating a substrate to avoid rapid cooling that can cause cracking;

Such materials with increased homogeneity; and

Such materials with the added elements combined with any known hardfacing material to achieve the stated match of coefficients of thermal expansion, the described acicular needle-like structure, and/or the stated increased homogeneity.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
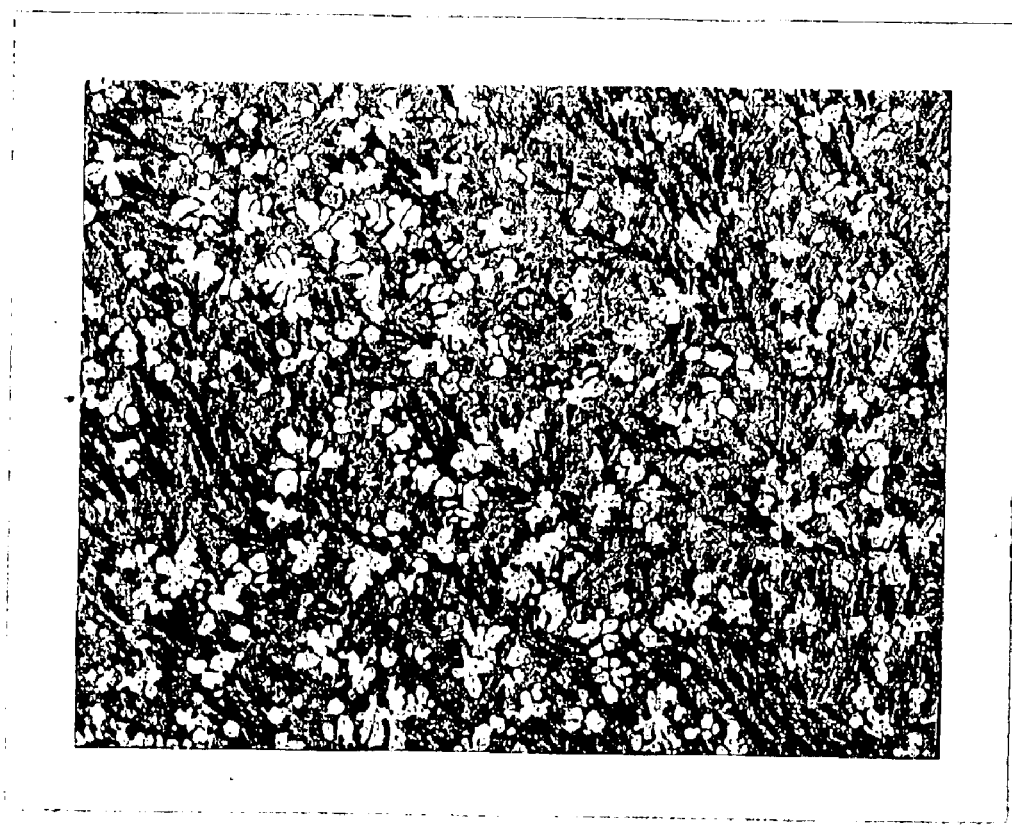
FIGS. 1 and 2 are photomicrographs of finished, metallurgically polished prior art hardfacing deposits.

FIG. 1 is a photomicrograph at 200× magnification of a metallurgically polished prior art hardfacing deposit of commercially available ARMACOR (™) material.

Figure 2:
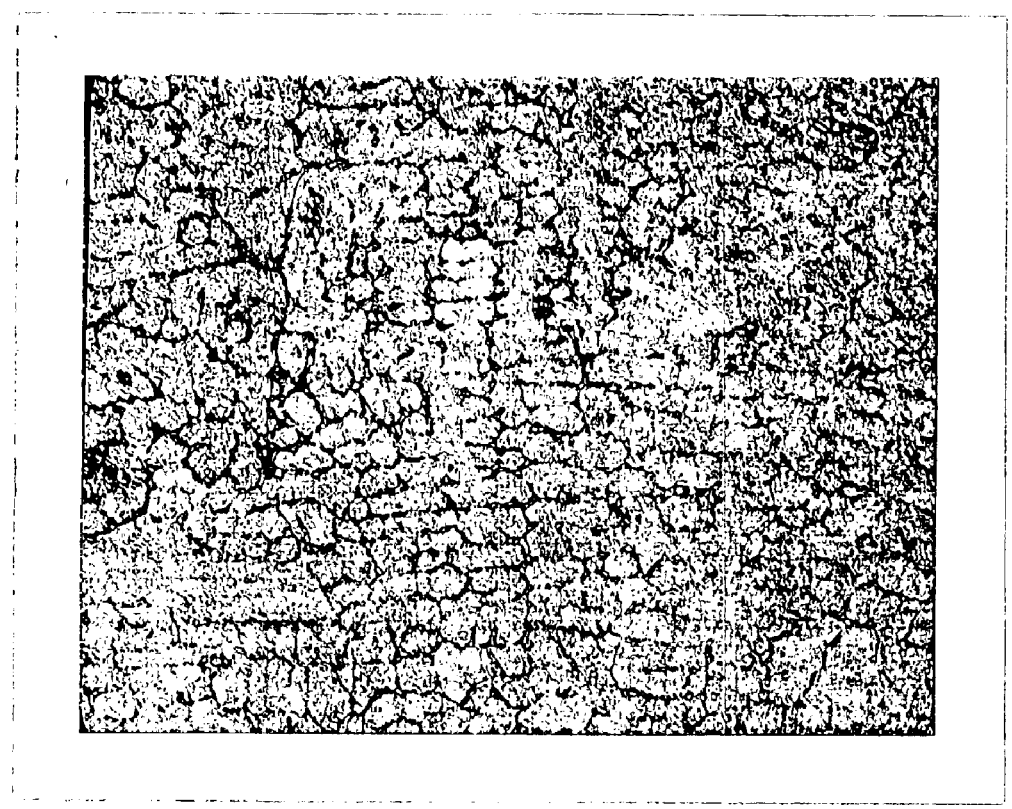

FIG. 2 is a photomicrograph at 200× magnification of a polished prior art hardfacing deposit of commercially available ARNCO 200 XT (™) material. The deposit as shown in FIG. 2 has grains of non-uniform size and distinct carbide pieces are present that contribute to cracking. The prior art materials of FIG. 1 and FIG. 2 have a generally randomly sized grain structure, which is relatively uncontrolled. The different sizes of the particles in the material of FIG. 1 and FIG. 2 contribute to metallurgical notches (stress risers) that can promote cracking.

Figure 3:
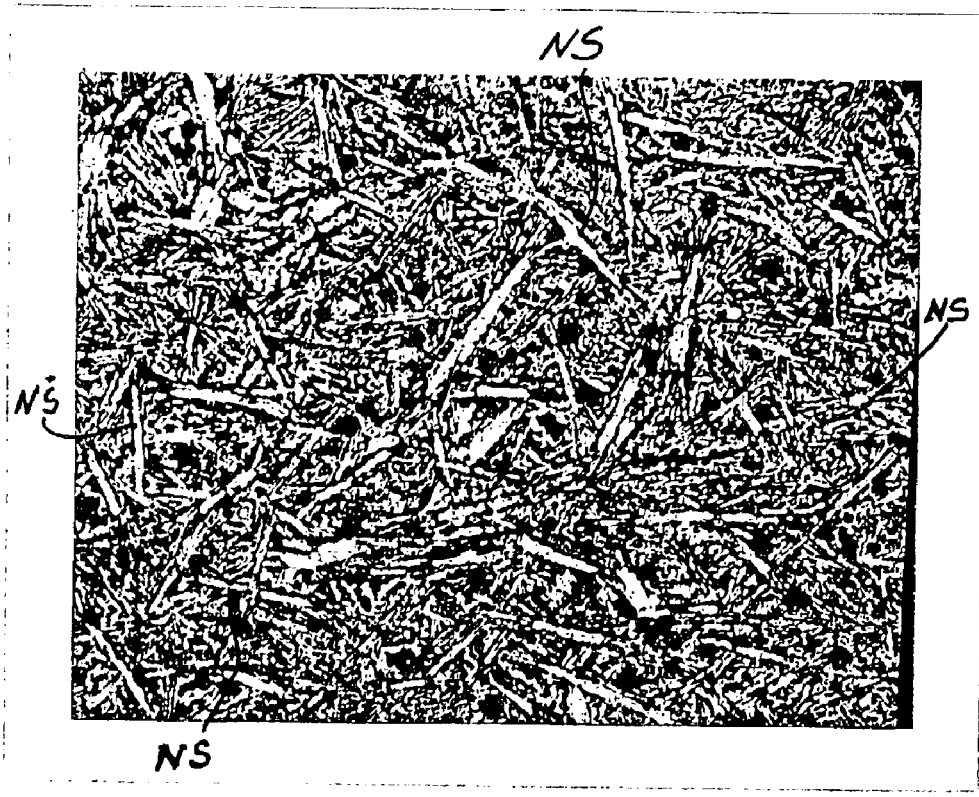
FIG. 3 is a photomicrograph of a finished, metallurgically polished hardfacing deposit according to the present invention.

FIG. 3 is a photomicrograph at a 200× magnification of a welded cross-section of hardfacing material according to the present invention whose composition is as follows (each % by weight):

| | |
|---|---|
| Chromium | 29.10–30.00% |
| Nickel | 5.00–6.00% |
| Titanium | 1.00–2.10% |
| Boron | 3.00–3.90% |
| Silicon | 1.00–2.10% |
| Manganese | 1.10–2.00% |
| Iron | Balance |

Elongated needle-like structures NS which are randomly interlocked with each other.

The material of FIG. 3 was applied by GMAW (Gas Metal Arc Welding); the shielding gas was 90 argon/5 oxygen; the amperage was 270; the voltage was 27–28; the speed of travel of the welding nozzle was 15" per minute with an oscillation of ¾". The contact tip to work distance was ⅞". The material was initially in the form of a cored wire.

The hardness on a Rockwell hardness scale of a cross-section of the material shown in FIG. 3 ranges between 54.0 and 54.7, i.e., there is less than a 1 point range which indicates a high level of homogeneity in the deposit.

Materials according to the present invention, including, but not limited to, that of FIG. 3 can be applied by any of the methods mentioned or referred to herein.

The present invention, therefore, in at least certain aspects, provides a method for applying wear resistant material to a substrate, the substrate having material with a substrate coefficient of thermal expansion, the method including applying the wear resistant material to the substrate with application apparatus, the wear resistant material having a wear resistant material coefficient of thermal expansion, the substrate coefficient of thermal expansion within 15% of the wear resistant material coefficient of thermal expansion. Such a method may have one or some of the following in any possible combination: wherein the application apparatus if from the group of electrode welding apparatus, arc welding apparatus, gas metal arc welding apparatus, atomization application apparatus, laser welding apparatus, plasma transferred arc apparatus, HVOF apparatus, nontransferred plasma apparatus, sintering apparatus, and hot isostatic pressing apparatus; wherein the wear resistant material is part of a cored wire; wherein the cored wire has an inner part and a sheath over the inner part and the inner part includes the wear resistant material; wherein the wear resistant material includes at least one element from the group consisting of arsenic, bismuth, antimony, and cerium; wherein the at least one element is present by weight as between 0.01% to 0.0001% of a total weight of the wear resistant material; wherein the wear resistant material as applied is present as a plurality of spaced-apart pieces in the shape of acicular needle-like pieces; wherein the acicular needle-like pieces have a first dimension and a second dimension, the first dimension at least 70% larger than the second dimension; heating the substrate prior to applying the wear resistant material to the substrate; wherein the substrate is heated to a temperature between 150 degrees F. and 650 degrees F.; wherein the wear resistant material as applied has a homogeneity of at least 80%; and/or wherein the wear resistant material includes by weight percent chromium 29.10–30.00%; nickel 5.00–6.00%; titanium 1.00–2.10%; boron 3.00–3.90%; silicon 1.00–2.10%; manganese 1.10–2.00%; iron-balance.

The present invention, therefore, in at least certain aspects, provides a method for applying wear resistant material to a substrate, the substrate having material with a substrate coefficient of thermal expansion, the method including applying the wear resistant material to the substrate with application apparatus, the wear resistant material having a wear resistant material coefficient of thermal expansion, the substrate coefficient of thermal expansion within 15% of the wear resistant material coefficient of thermal expansion, wherein the wear resistant material includes at least one element from the group consisting of arsenic, bismuth, antimony, and cerium, wherein the at least one element is present by weight as between 0.01% to 0.0001% of a total weight of the wear resistant material, wherein the wear resistant material as applied is present as a plurality of spaced-apart pieces in the shape of acicular needle-like pieces, and wherein the wear resistant material as applied has a homogeneity of at least 80%.

The present invention, therefore, in at least certain aspects, provides a method for applying wear resistant material to a substrate, the substrate comprised of material with a substrate coefficient of thermal expansion, the method including applying the wear resistant material to the substrate with application apparatus, the wear resistant material having a wear resistant material coefficient of thermal expansion, the substrate coefficient of thermal expansion within 15% of the wear resistant material coefficient of thermal expansion, and wherein the wear resistant material includes at least one element from the group consisting of arsenic, bismuth, antimony, and cerium.

The present invention, therefore, in at least certain aspects, provides a method for applying wear resistant material to a substrate, the substrate comprised of material with a substrate coefficient of thermal expansion, the method including applying the wear resistant material to the substrate with application apparatus, the wear resistant material having a wear resistant material coefficient of thermal expansion, and wherein the wear resistant material as applied is present as a plurality of spaced-apart pieces in the shape of acicular needle-like pieces.

The present invention, therefore, in at least certain aspects, provides a method for applying wear resistant material to a substrate, the substrate comprised of material with a substrate coefficient of thermal expansion, the method including applying the wear resistant material to the substrate with application apparatus, and wherein the wear resistant material includes at least one element from the group consisting of arsenic, bismuth, antimony, and cerium.

The present invention, therefore, in at least certain aspects, provides a deposit of wear resistant material on a substrate, the deposit made by a method including applying the wear resistant material to the substrate with application apparatus, the wear resistant material having a wear resistant material coefficient of thermal expansion, the substrate coefficient of thermal expansion within 15% of the wear resistant material coefficient of thermal expansion.

The present invention, therefore, in at least certain aspects, provides a wear resistant material having at least one element from the group consisting of arsenic, bismuth, antimony, and cerium; and such a wear resistant material with elements present by weight percent thus: chromium 29.10–30.00%; nickel 5.00–6.00%; titanium 1.00–2.10%; boron 3.00–3.90%; silicon 1.00–2.10%; manganese 1.10–2.00%; iron-balance.

The present invention, therefore, in at least certain aspects, provides a wear resistant material applied to a substrate, the wear resistant material having arsenic, bismuth, antimony, cerium, and the wear resistant material present as a plurality of spaced-apart acicular needle-like pieces.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

All patents referred to by number herein are incorporated fully herein for all purposes. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A method for applying wear resistant material to a substrate, the substrate comprised of material with a substrate coefficient of thermal expansion, the method comprising.
   applying the wear resistant material to the substrate with application apparatus, the wear resistant material having a wear resistant material coefficient of thermal expansion, the substrate coefficient of thermal expansion within 15% of the wear resistant material coefficient of thermal expansion, wherein the wear resistant material includes at least one element from the group consisting of arsenic,and bismuth.

2. The method of claim 1 wherein the application apparatus if from the group consisting of electrode welding apparatus, arc welding apparatus, gas metal arc welding apparatus, atomization application apparatus, laser welding apparatus, plasma transferred arc apparatus, HVOF apparatus, nontransferred plasma apparatus, sintering apparatus, and hot isostatic pressing apparatus.

3. The method of claim 1 wherein the wear resistant material is part of a cored wire.

4. The method of claim 3 wherein the cored wire has an inner part and a sheath over the inner part and the inner part includes the wear resistant material.

5. The method of claim 1 wherein the at least one element is present by weight as between 0.01% to 0.0001% of a total weight of the wear resistant material.

6. The method of claim 1 wherein the wear resistant material as applied is present as a plurality of spaced-apart pieces in the shape of acicular needle-like pieces, the spaced-apart pieces uniformly dispersed in the wear resistant material and interlocked with each other for resisting cracking of the wear resistant material.

7. The method of claim 6 wherein the acicular needle-like pieces have a first dimension and a second dimension, the first dimension at least 70% larger than the second dimension.

8. The method of claim 1 further comprising
   heating the substrate prior to applying the wear resistant material to the substrate.

9. The method of claim 8 wherein the substrate is heated to a temperature between 150 degrees F. and 650 degrees F.

10. The method of claim 1 wherein the wear resistant material as applied has a homogeneity of at least 80%.

11. The method of claim 1 wherein the wear resistant material includes by weight percent chromium 29.10–30.00%; nickel 5.00–6.00%; titanium 1.00–2.10%; boron 3.00–3.90%; silicon 1.00–2.10%; manganese 1.10–2.00%; iron-balance.

12. A method for applying wear resistant material to a substrate, the substrate comprised of material with a substrate coefficient of thermal expansion, the method comprising
   applying the wear resistant material to the substrate with application apparatus, the wear resistant material having a wear resistant material coefficient of thermal expansion, the substrate coefficient of thermal expansion within 15% of the wear resistant material coefficient of thermal expansion,
   wherein the wear resistant material includes at least one element from the group consisting of arsenic and bismuth,
   wherein the at least one element is present by weight as between 0.01% to 0.0001% of a total weight of the wear resistant material,
   wherein the wear resistant material as applied is present as a plurality of spaced-apart pieces in the shape of acicular needle-like pieces uniformly dispersed in the wear resistant material, and
   wherein the wear resistant material as applied has a homogeneity of at least 80%.

13. A method for applying wear resistant material to a substrate, the substrate comprised of material with a substrate coefficient of thermal expansion, the method comprising
   applying the wear resistant material to the substrate with application apparatus, the wear resistant material having a wear resistant material coefficient of thermal expansion, the substrate coefficient of thermal expansion within 15% of the wear resistant material coefficient of thermal expansion, and
   wherein the wear resistant material includes at least one element from the group consisting of arsenic and bismuth.

14. A deposit of wear resistant material on a substrate, the deposit made by a method comprising
   applying the wear resistant material to the substrate with application apparatus, the wear resistant material having a wear resistant material coefficient of thermal expansion, the substrate coefficient of thermal expansion within 15% of the wear resistant material coefficient of thermal expansion, the wear resistant material comprising at least one element from the group consisting of arsenic and bismuth.

15. The deposit of wear resistant material of claim 14 wherein the at least one element is present by weight as between 0.01% to 0.0001% of a total weight of the wear resistant material.

16. The deposit of wear resistant material of claim 14 wherein the wear resistant material includes by weight percent chromium 29.10–30.00%; nickel 5.00–6.00%; titanium 1.00–2.10%; boron 3.00–3.90%; silicon 1.00–2.10%; manganese 1.10–2.00%; iron-balance.

17. The deposit of wear resistant material of claim 14 wherein the wear resistant material as applied includes a plurality of spaced-apart pieces in the shape of acicular needle-like pieces, the spaced-apart pieces uniformly dispersed in the wear resistant material and interlocked with each other for resisting cracking of the wear resistant material.

18. A method for applying wear resistant material to a substrate, the substrate comprised of material with a substrate coefficient of thermal expansion, the method comprising
   applying the wear resistant material to the substrate with application apparatus, the wear resistant material having a wear resistant material coefficient of thermal expansion, the substrate coefficient of thermal expansion within 15% of the wear resistant material coefficient of thermal expansion, wherein the wear resistant material includes at least one element from the group consisting of arsenic and bismuth,
   wherein the at least one element is present by weight as between 0.01% to 0.0001% of a total weight of the wear resistant material, wherein the wear resistant material as applied is present as a plurality of spaced-apart pieces in the shape of acicular needle-like pieces, the spaced-apart pieces uniformly dispersed in the wear resistant material and interlocked with each other for resisting cracking of the wear resistant material, and wherein the wear resistant material includes by weight percent chromium 29.10–30.00%; nickel 5.00–6.00%; titanium 1.00–2.10%; boron 3.00–3.90%; silicon 1.00–2.10%; manganese 1.10–2.00%; iron-balance.

19. The method of claim 18 wherein the acicular needle-like pieces have a first dimension and a second dimension, the first dimension at least 70% larger than the second dimension.

* * * * *